UNITED STATES PATENT OFFICE.

MARTINUS H. CARON, OF WELTEVREDEN, JAVA, DUTCH EAST INDIES, ASSIGNOR TO CLEVENGER & CARON, OF WASHINGTON, DISTRICT OF COLUMBIA, A FIRM.

PROCESS OF TREATING NICKEL ORES.

1,346,175.   Specification of Letters Patent.   Patented July 13, 1920.

No Drawing.   Application filed May 19, 1919. Serial No. 298,148.

*To all whom it may concern:*

Be it known that I, MARTINUS H. CARON, a subject of Queen of Netherlands, resident of Weltevreden, Java, Dutch East Indies, have invented certain new and useful Improvements in Processes of Treating Nickel Ores of which the following is a specification.

The present invention is a process of treating nickel ores, particularly hydrated silicates, for the recovery of nickel.

It is generally known that hydrated silicates of nickel, such as garnierite, genthite, nepouite, noumeite, pimelite, etc., and nickel ores of oxidic character, in most of which the nickel is associated with base-metal oxids and earthy substances, cannot be satisfactorily extracted by acid or other hydrometallurgical treatment.

By the present process nickel ores of the character referred to are made readily amenable to the usual modes of metal-recovery.

According to my process, the ore, preferably after being crushed, is first subjected to a reducing roast, by means of producer gas, wood gas or any other generator gas or reducing agent. This may be done either by directly heating the ore in the reducing atmosphere, or by first heating the ore to the proper temperature and thereafter subjecting it to the reducing agents. The principal thing in this reduction, which may be suitably effected by means of $CO$, $H_2$, $(C_xH_y)$, etc., is that the hydrous nickel silicate is completely reduced to a black, readily-soluble condition indicative of amorphous metallic nickel.

The temperature of reduction depends largely on the kind of ore treated, and an earthy nickel ore may be reduced at a much lower temperature than other varieties and still enable excellent acid extractions to be made. In the case of garnierite and similar hydrous nickel silicates, temperatures of from 850° to 900° C. may be required to yield a readily extractable product. Temperatures higher than 900° may be used, although from the standpoint of fuel economy this will have little advantage.

The black amorphous nickel partially reoxidizes if exposed to the air while hot and goes over again to less soluble compounds. Reoxidation must therefore be prevented, and this may be accomplished by cooling the reduced ore to the necessary degree in a non-oxidizing or reducing atmosphere, or by chilling the hot or partially cooled ore in water, out of contact with air, or in any other way which will exclude oxygen from access to the hot ore. If the reduced ore is cooled in producer gas, care should be taken, if it is desired to recover the nickel in the reduced condition described that at temperatures below 150° C. the passing of strong currents of the gas over the ore is prevented, to avoid nickel losses through the formation of volatile nickel-carbonyl.

After the reduction step, the ore is very magnetic, and the nickel-content is readily soluble in strong or dilute acids, acid salts, such as niter-cake, or salts which are readily split by hydrolysis, such as ferric salts, or may be brought into solution by normal base-metal salts such as copper sulfate, etc. In the latter case nickel sulfate is produced and metallic copper precipitated. When the nickel is dissolved out by dilute acids, heating is not generally necessary, since in most cases temperatures of 30° C. or less are sufficient for a good extraction of the nickel. Furthermore if heat is employed, undesirable solution of some of the silica may occur.

From the solutions containing the nickel, the metal may be readily recovered by electrolysis or any other of the known methods.

I claim:

1. In the process of recovering values from nickel silicate ores, the steps which consist in subjecting the ore to a preparatory reducing roast and cooling the reduced ore under non-oxidizing conditions.

2. In the process of recovering values from nickel silicate ores, the steps which consist in subjecting the ore to a preparatory reducing roast and cooling the reduced ore under reducing conditions.

3. In the process of recovering values from nickel silicate ores, the steps which consist in heating the ore to roasting temperature, subjecting the heated ore to the action of a gaseous reducing agent and cooling the reduced ore under non-oxidizing conditions.

4. The process of recovering values from nickel silicate ores, comprising subjecting the ore to a preparatory reducing roast, cooling the reduced ore under non-oxidizing conditions, and extracting the nickel values from the reduced ore.

5. The process of recovering values from nickel silicate ores, comprising subjecting the ore to a preparatory reducing roast, cooling the reduced ore under non-oxidizing conditions, and dissolving the nickel values from the reduced ore.

In testimony whereof I affix my signature.

MARTINUS H. CARON.